United States Patent
Uehara

(10) Patent No.: US 6,204,803 B1
(45) Date of Patent: Mar. 20, 2001

(54) RADAR APPARATUS

(75) Inventor: Naohisa Uehara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/408,560

(22) Filed: Sep. 30, 1999

(30) Foreign Application Priority Data

May 28, 1999 (JP) .................................................. 11-150333

(51) Int. Cl.[7] .......................... G01G 13/93; G01G 13/42
(52) U.S. Cl. .......................... 342/70; 342/109; 342/111; 342/194; 342/196
(58) Field of Search .................................. 342/70, 71, 72, 342/98, 99, 107, 109, 111, 114, 115, 135, 152, 192, 194, 196

(56) References Cited

U.S. PATENT DOCUMENTS

| | | | |
|---|---|---|---|
| 5,517,196 | * | 5/1996 | Pakett et al. ............................. 342/70 |
| 5,929,802 | * | 7/1999 | Russell et al. .......................... 342/70 |
| 5,959,570 | * | 9/1999 | Russell et al. .......................... 342/70 |
| 6,107,956 | * | 8/2000 | Russell et al. .......................... 342/70 |
| 6,121,917 | * | 9/2000 | Yamada ................................ 342/128 |

OTHER PUBLICATIONS

"Monopulse Doppler radar for vehicle applications", Woll, J.D., Intelligent Vehicles '95 Symposium., Proceedings of the , 1995, pp. 42–47, 1995.*

* cited by examiner

*Primary Examiner*—John B. Sotomayor
(74) *Attorney, Agent, or Firm*—Sughrue, Mion, Zinn, Macpeak & Seas, PLLC

(57) ABSTRACT

A radar apparatus is comprised of: receiving means for IQ-phase-detecting a reception electromagnetic wave received when a transmission electromagnetic wave is reflected from a target object and returned from the target object; signal converting means for FFT-processing an output signal of the receiving means; and amplitude level correcting means in which if there are one pair of spectrums having positive and negative peak values of amplitude levels, while absolute values of frequencies thereof are identical to each other, among the data converted by this signal converting means, then the amplitude level having the larger peak value is corrected so as to acquire a peak value of a true amplitude level. In the case that spectrums having both the positive and negative peak values and the frequencies whose absolute values are identical to each other are acquired as $(A_b+jB_b)$ and $(A_s+jB_s)$, the amplitude level correcting means calculates the peak value of the true amplitude level as $\{(A_b+A_s)^2+(B_b-B_s)^2\}^{1/2}$.

7 Claims, 4 Drawing Sheets

FFT RESULT WHEN ONE CHANNEL
SIGNAL SYSTEM IS SATURATED

RADAR APPARATUS

BACKGROUND OF THE INVENTION

The present invention relates to a radar apparatus mounted on a vehicle such as an automobile, and used to constitute, for instance, a vehicle-to-vehicle safety distance warning system. More specifically, the present invention is directed to a peak value correction of an amplitude level, capable of correcting a peak value of an amplitude level of a detected spectrum as a correct value.

As this sort of radar apparatus, an FMCW radar apparatus is known. That is, since a transmitting/receiving common antenna is employed, a compact FMCW radar apparatus can be constructed and thus, can be easily mounted on an automobile. FIG. 4 is a block diagram for representing an arrangement of a conventional on-vehicle radar apparatus. In FIG. 4, reference numeral 1 indicates an oscillator, reference numeral 2 shows a power divider, reference numeral 3 represents a transmitter amplifier, and reference numeral 4 denotes a circulator. Also, reference numeral 5 indicates a transmitting/receiving common antenna, and this antenna is arranged by an electromagnetic radiator 51 and a reflection mirror 52. Furthermore, reference numeral 6 indicates a target object, reference numeral 7 indicates a receiver amplifier, reference numeral 8 represents an IQ detecting mixer, reference numeral 9 shows a filter, and reference numeral 10 indicates an AGC amplifier. Further, reference numeral 11 represents an A/D converter, reference numeral 12 shows a signal processing apparatus, reference numeral 13 indicates an antenna scanning motor, and reference numeral 14 represents an handle angle sensor.

Next, operations of the conventional radar apparatus with employment of the above-described arrangement will now be explained. The signal processing apparatus 12 outputs a linear voltage signal for an FM modulation. In response to this FM-modulating voltage signal, the oscillator 1 produces an FM-modulated electromagnetic wave. This electromagnetic wave is divided into two wave portions by the power divider 2. One divided electromagnetic wave portion is entered into the IQ detecting mixer 8. After the other divided electromagnetic wave portion is amplified by the transmitter amplifier 3, the amplified electromagnetic wave portions radiated via the circulator 4 from the transmitting/receiving common antenna 5 to the space. The electromagnetic wave which is radiated as a transmission electromagnetic wave from the transmitting/receiving common antenna 5 to the space is reflected from the target object 6, and then is entered into the transmitting/receiving common antenna 5 as a reception electromagnetic wave having a delay time "Td" with respect to the transmission when the target object 6 owns a relative speed, the reception electromagnetic wave having a Doppler shift "fd" with respect to the transmission electromagnetic wave is inputted to the transmitting/receiving common antenna 5. After the electromagnetic wave received by the transmitting/receiving common antenna 5 is amplified by the receiver amplifier 7, the amplified electromagnetic wave is mixed with the electromagnetic wave produced from the oscillator 1 by the IQ detecting mixer 8, so that a beat signal corresponding to both the delay time "Td" and the Doppler shift "fd" is outputted. The resulting beat signal is filtered by the filter 9, and the filtered signal is amplified by the AGC amplifier 10, and thereafter, the amplified signal is entered into the A/D converter 11. Based upon the A/D-converted beat signal, the signal processing apparatus 12 calculates a distance measured from the target object 6 and a relative speed.

Next, a description will now be made of a method for calculating a distance and a relative speed. FIG. 5 is an explanatory diagram for explaining an example of a method for calculating a distance and a relative speed by a conventional on-vehicle radar apparatus. In FIG. 5, a transmission electromagnetic wave is FM-modulated by a frequency sweeping bandwidth "B" and a modulation period "Tm". A reception electromagnetic wave owns delay time "Td" defined by such that the transmission electromagnetic wave is reflected from a target object 6 located at a distance "R" and then the reflected transmission electromagnetic wave is entered into the transmitting/receiving antenna 5. Also, when the target object 6 owns a relative speed "V", a reception electromagnetic wave is Doppler-shifted by "fd" with respect to a transmission electromagnetic wave. At this time, both a frequency difference "Fbu" between a transmission signal and a reception signal when a frequency is increased, and another frequency difference "Fbd" between a transmission signal and a reception signal when a frequency is decreased are outputted as a beat signal from an IQ detecting mixer 8. This beat signal is acquired via an A/D converter 11 into a signal processing apparatus as data. This acquired beat signal is processed by way of the FFT (Fast Fourier Transform) so as to obtain the frequency differences "Fbu" and "Fbd", and also a peak value "M" of amplitude levels thereof, as shown in FIG. 6. It should be understood that the peak value of "M" is a value equivalent to a reception strength, and will be referred to as a "reception strength" hereinafter.

A method for obtaining the frequency differences "Fbu" and "Fbd", and also the reception strength "M" will now be summarized as follows: That is, when the FFT process operation is carried out, the amplitude signals with respect to the respective abscissa time and ordinate time can be converted into the amplitudes of the frequency components with respect to the respective abscissa frequency and ordinate frequency. In the case that the frequency difference "Fbu" and the reception strength "M" are acquired, generally speaking, such a peak point where a level of amplitude becomes a peak is found out, and an amplitude level value of this peak and a frequency value thereof are assumed as the reception strength "M" and the frequency difference "Fbu". This frequency acquisition is similarly applied to another frequency "Fbd". In general, the reception strengths of the frequency differences "Fbu" and "Fbd" are identical to each other, and become "M".

Based upon the above-described items "Fbu", "Fbd", "Tm", and "B", the light velocity "C(=3.0×10$^8$ m/s)", and a wavelength "λ" of a carrier wave (if a basic frequency of a carrier wave is defined as f$_0$=77 GHz, then a wavelength "λ" is given as λ=4.0×10$^{-3}$ m), the distance "R" and the relative speed "V" of the target object 6 are calculated by the below-mentioned formulae (1) and (2):

$$R=(TmC/4B)\times(Fbu+Fbd) \quad (1)$$

$$V=(\lambda/4)\times(Fbu-Fbd) \quad (2)$$

Also, in the case that a plurality of target objects are located, based upon a plurality of frequency differences "Fbu" between transmission signals and reception signals when a frequency is increased, and a plurality of frequency differences "Fbd" between transmission signals and reception signals when a frequency is decreased, both "Fbu" and "Fbd" of the same object are selected. Then, the distance "R" and the relative speed "V" are obtained from the above-described formulae (1) and (2).

Next, operations of the IQ detecting mixer 8 will now be explained in detail. In FIG. 4, the electromagnetic wave produced from the oscillator 1 is distributed to the power divider 2, and is further subdivided by ½ into two electromagnetic wave portions by the power divider P/D at the input unit of the IQ detecting mixer 8, and then, these two electromagnetic wave portions are entered as LO (local) signals into mixers 81 and 82. Also, the received electromagnetic wave is amplified by the reception amplifier 7, and thereafter, the amplified electromagnetic wave is subdivided by ½ into two electromagnetic wave portions by the power divider P/D. One subdivided electromagnetic wave portion is directly entered into the mixer 81. The other subdivided electromagnetic wave portion is entered via a 90-degree signal line (¼ wavelength) to the mixer 82. In this case, a beat signal outputted from the two mixers 81 and 82 outputs an In-phase component "I" and also a Quadrature component "Q" having a phase difference of 90 degrees with respect to the In-phase component "I". The IQ components derived from these mixers 81 and 82 are sampled by the A/D converter 11. Then, the I component and the Q component are processed as a real number portion and an imaginary number portion by the complex FFT processing operation.

When the complex FFT processing operation is carried out, it is possible to judge as to whether or not the frequency component of the spectrum is equal to a positive component based upon the positive/negative value of the phase difference by 90 degrees. As indicated in FIG. 6, only one spectrum appears after the IQ components are FFT-processed. In other words, when the FFT processing operation is carried out by employing the normal mixer, one pair of spectrums whose positive/negative frequency components are inverted appear on the frequency axis, so that it is not possible to judge as to whether the frequency component is equal to a positive value or a negative value. To the contrary, when the FFT processing operation is carried out by employing the IQ detecting mixer 8, as represented in FIG. 6, since only one spectrum appears after the IQ components are FFT-processed, it is possible to judge as to whether the frequency component of the FFT-processed IQ components is equal to a positive value or a negative value. As a consequence, it is possible to decrease an artifact, or a false image which is produced by mistakenly combining the frequency difference "Fbu" with the frequency difference "Fbd" in such a case that a plurality of targets are detected by employing the IQ detecting mixer rather than using the normal mixer.

Next, a description will now be made of a method for calculating a direction of the target object 6 by the signal processing apparatus 12 from the reception strength "M". As the conventional method for calculating the direction of the target object, the following typical methods have been disclosed, i.e., the mono-pulse method, the sequential lobbing method, and the conical scanning method, for example, in the Examined Japanese Patent Application Publication No. Hei 7-20016. In this case, the sequential lobbing method is described. This sequential lobing method is equivalent to the method disclosed in Japanese Laid-open Patent Application No. Hei-7-92258, namely, such an angle measuring method capable of measuring an angle over a wide range while using a normalized difference between reception strengths of two radar beams having different axes.

The sequential lobbing method is summarized as follows. That is, after a distance, a relative speed, and a reception strength M have been measured along a preselected direction "θ1", the signal processing apparatus 12 actuates the motor 13 so as to move the transmitting/receiving common antenna 5 along a next direction "θ2", and then, similarly, measures a distance, a relative speed, and a reception strength "M2". The signal processing apparatus 12 selects the same distance data and the same relative speed data from the data detected along these plural directions, and can basically measure an angle by checking as to whether or not the reception strength M1 is higher than the reception strength M2.

It should be understood that symbol "θ" indicates an angle, in which a front direction of a vehicle is set to "0°", a forward right oblique direction of the vehicle is set to a "positive angle", and a forward left oblique direction of the vehicle is set to a "negative angle".

Concretely speaking, both a summation pattern S(θ) and a difference pattern D(θ) are calculated from an antenna beam pattern B1(θ) and another antenna beam pattern B2(θ) along two predetermined directions "θ1" and "θ2" by the below-mentioned formulae:

$$S(\theta)=B1(\theta)+B2(\theta) \quad (3)$$

$$D(\theta)=B1(\theta)-B2(\theta) \quad (4)$$

Next, DS(θ) of the following formulae which is normalized by S(θ) is obtained=

$$DS(\theta)=D(\theta)/S(\theta) \quad (5)$$

It should be noted that DS(θ) is a monotone increase, or a monotone decrease with respect to "θ" within a half-value width "θs" of S(θ).

Next, while a center between θ1 and θ2 along two predetermined directions is set as "θo" and a half-value width of S(θ) is set as "θs", both an angle "θn" normalized by "θs" and an inclination "K" of DS(θ) in the vicinity of θn=0 are calculated by the following formulae=

$$\theta n=(\theta-\theta o)/\theta s \quad (6)$$

$$k=DS(\theta)/\theta n \quad (7)$$

Also, DS acquired from a monitoring result is calculated based on both the reception strength M1 and the reception strength M2 by the following formulae:

$$DS=(M1-M2)/(M1+M2) \quad (8).$$

As a result, based upon the precalculated θs, K, θo, and also DS acquired from the monitoring operation, the angle "θ" may be calculated by the below-mentioned formula (9):

$$\theta=(\theta s/k)\cdot DS+\theta o \quad (9).$$

A relative position of a car driven ahead can be grasped based on the above-measured distance and also angle up to the target object. Also, when a curvature of a road can be grasped from the handle angle sensor 14, a position of a lane along which the own car is driven (lane width is predetermined as 3.5 m). As a result, it can be seen whether or not the car driven ahead is traveled on the same lane as the own car. A judgement is made in this manner as to whether or not the target object corresponds to the car driven ahead which is traveled on the same lane as the own car. Based upon the judgement result, the signal processing apparatus issues the vehicle-to-vehicle safety distance warning notification and also executes the forward-vehicle-following drive so as to keep the safety vehicle-to-vehicle distance.

Since two sets of output signals from the IQ detecting mixer 8 are entered via the A/D converter 11 into the signal processing apparatus 12 so as to be FFT-processed in the above-explained conventional radar apparatus, when the unbalance IQ amplitude value occurs and the IQ phase error occurs in the I-channel signal and the Q-channel signal, which are inputted into the A/D converter 11, as represented in FIG. 7, false spectrums will appear in the frequencies of the spectrums, the symbols of which are inverted. Also, the larger the degrees of the IQ phase error and the unbalance IQ amplitude values are increased, the larger the amplitude level of the false spectrum becomes. The causes of the phase error/unbalance amplitude value may be conceivable from the correctness of the 90-degree signal path of the IQ detecting mixer 8, the balance of the power divider P/D of the IQ detecting mixer 8, the fluctuations in the conversion losses of the two mixers 81/82 employed in the IQ detecting mixer 8, the temperature characteristic of the IQ detecting mixer 8, and the multiplexing reflection. In principle, although the phase error and the unbalance amplitude value of the I, Q-channel signals caused by the above-described items may be reduced, these unbalance reasons cannot be completely solved in view of cost, and further under drive conditions of automobiles. Under such a reason, there are problems that the amplitude of the true spectrum is reduced, the detection performance of the true spectrum is deteriorated, and the angle-measuring calculation error happens to occur due to the amplitude error of the true spectrum.

SUMMARY OF THE INVENTION

The present invention has been made to solve the above-described problems, and therefore, has an object to provide a low-cost radar apparatus having high performance, capable of correctly measuring a reception strength, namely a peak value of an amplitude level, and also capable of suppressing an occurrence of an angle-measuring error, while employing a signal converting means and an amplitude level correcting means, i.e., the signal converting means for converting an output signal of a receiving means for performing an IQ phase detection into data indicated by a relationship between a frequency and an amplitude level of this output signal, from which a frequency spectrum is revealed; and amplitude level correcting means in which if there are one pair of spectrums having positive and negative peak values of amplitude levels, while absolute values of frequencies thereof are identical to each other, among the data converted by this signal converting means, then the amplitude level having the larger peak value is corrected so as to acquire a peak value of a true amplitude level. As a consequence, even when a phase error between an I-channel signal of an IQ detecting mixer and a Q-channel signal thereof and also an unbalance amplitude value thereof happen to occur, the radar apparatus can correctly measure the reception strength, namely the peak value of the amplitude level, and furthermore, can suppress the occurrence of the angle-measuring error.

A radar apparatus, according to the present invention, is featured by comprising: transmitting means for outputting a transmission electromagnetic wave; receiving means for IQ-phase-detecting a reception electromagnetic wave received when the transmission electromagnetic wave is reflected from a target object and returned from the target object; signal converting means for converting an output signal of the receiving means into data indicated by a relationship between a frequency and an amplitude level of the output signal, from which a frequency spectrum is revealed; and amplitude level correcting means in which if there are one pair of spectrums having positive and negative peak values of amplitude levels, while absolute values of frequencies thereof are identical to each other, among the data converted by this signal converting means, then the amplitude level having the larger peak value is corrected so as to acquire a peak value of a true amplitude level.

Also, the radar apparatus is further comprised of: beam scanning means for changing a beam direction of a transmission electromagnetic wave outputted from the transmitting means and also a beam direction of a reception electromagnetic wave returned from the target object; and measured-angle processing means for calculating a direction of the target object based upon reception signals produced along a plurality of beam direction changed by the beam scanning means as to the same target object by using the peak value of the true amplitude level along each of the directions, acquired by the amplitude level correcting means.

Furthermore, in the case that spectrums having both the positive and negative peak values and the frequencies whose absolute values are identical to each other are acquired as (Ab+jBb) and (As+jBs), the amplitude level correcting means calculates the peak value of the true amplitude level as $\{(Ab+As)^2+(Bb-Bs)^2\}^{1/2}$.

Also, the amplitude level correcting means corrects the peak value of the amplitude level based upon data which is previously acquired by way of an experiment and then is stored.

Moreover, the signal converting means FFT(fast Fourier transform)-transforms an I-channel signal and a Q-channel signal, which are IQ-phase-detected, as a real number part and an imaginary number part, respectively.

In addition, in order to judge that the absolute values of the frequencies are identical to each other, a judgement width containing a predetermined margin is set.

Also, the judgement width containing the predetermined margin is selected to be on the order of +1 bin and −1 bin.

DETAILED DESCRIPTION OF THE PREFERRED EMBODIMENTS (Embodiment 1)

Figure 1:
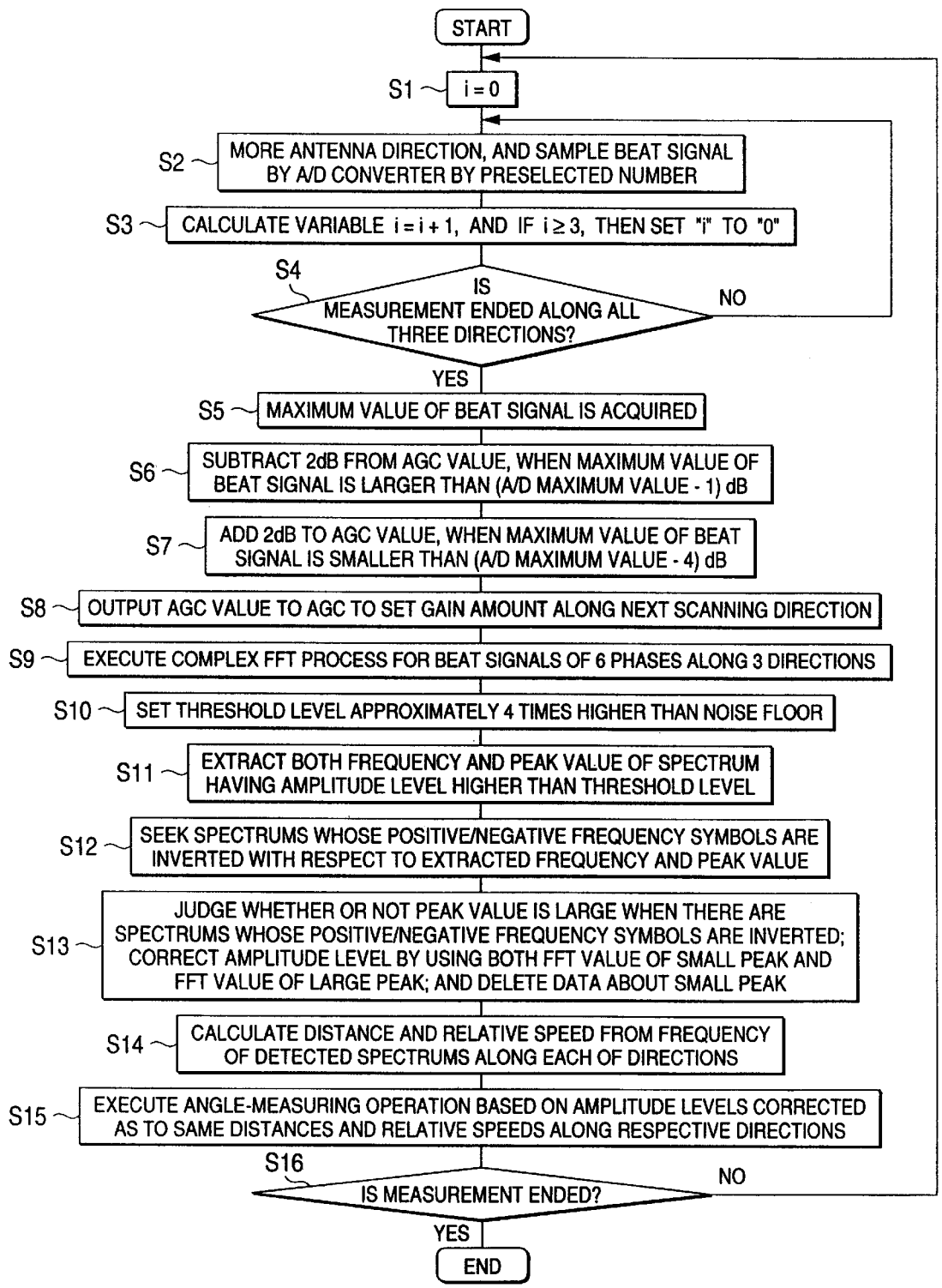
FIG. 1 is a flow chart for describing a process flow operation for calculating a distance between a target object and a radar apparatus according to an embodiment 1, and also a relative speed and an angle of the target object.
Figure 4:
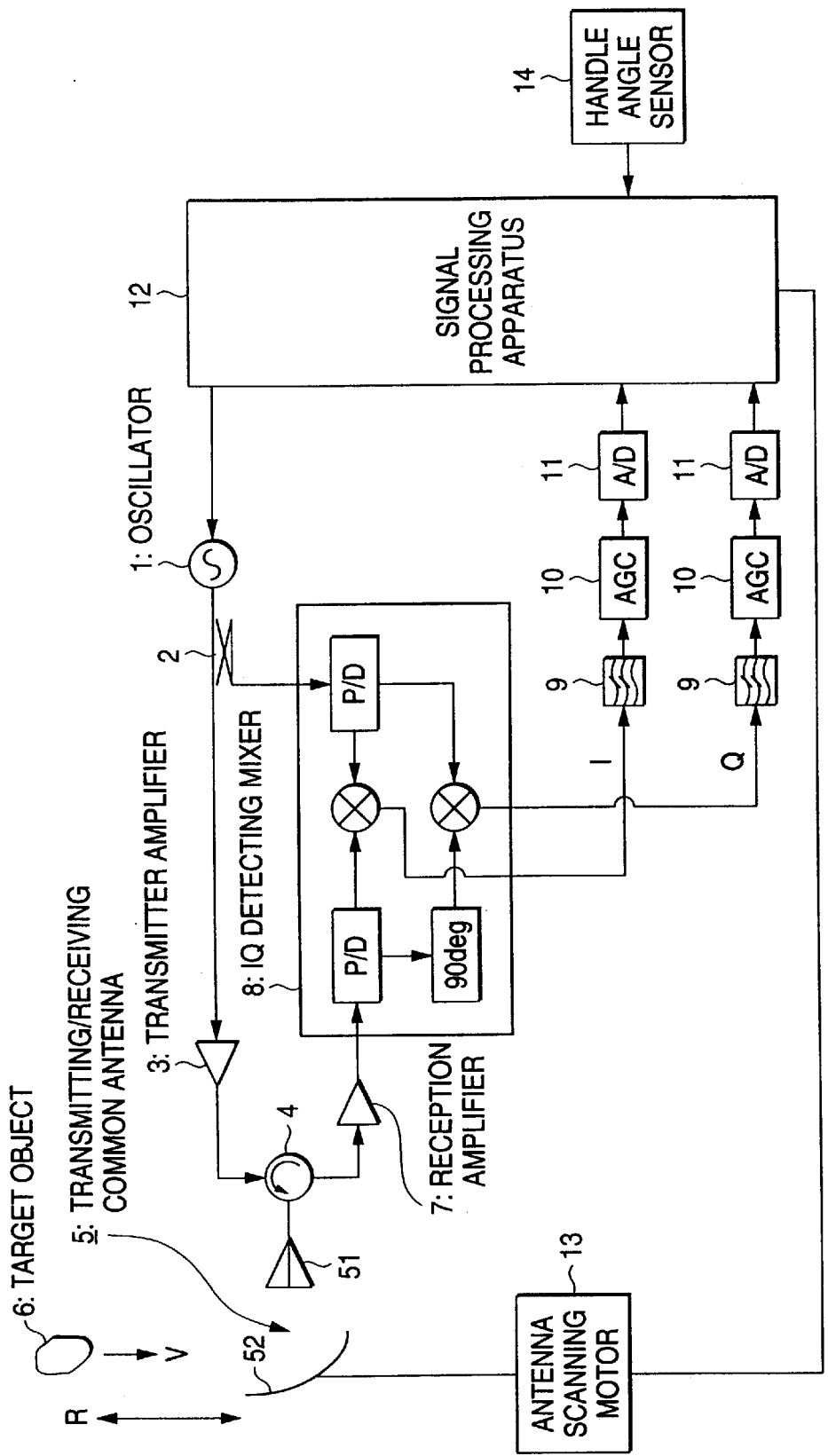
FIG. 4 is a block diagram for showing the conventional on-vehicle radar apparatus.
Figure 5:
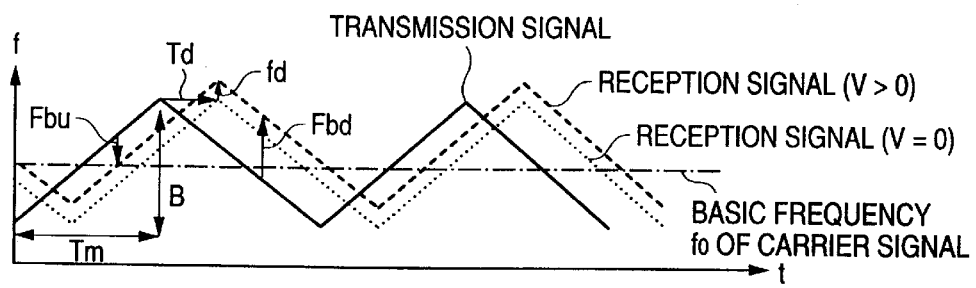
FIG. 5 is an explanatory diagram for explaining the calculation of the distance and the relative speed by the conventional on-vehicle radar apparatus.

FIG. 1 is a flow chart for representing a process flow operation for calculating a distance between a target object and a radar apparatus according to an embodiment 1, a relative speed (relative velocity) and an angle of this target object. It should be noted that a diagram for showing an arrangement of the radar apparatus is the same as that of FIG. 4.

Figure 7:
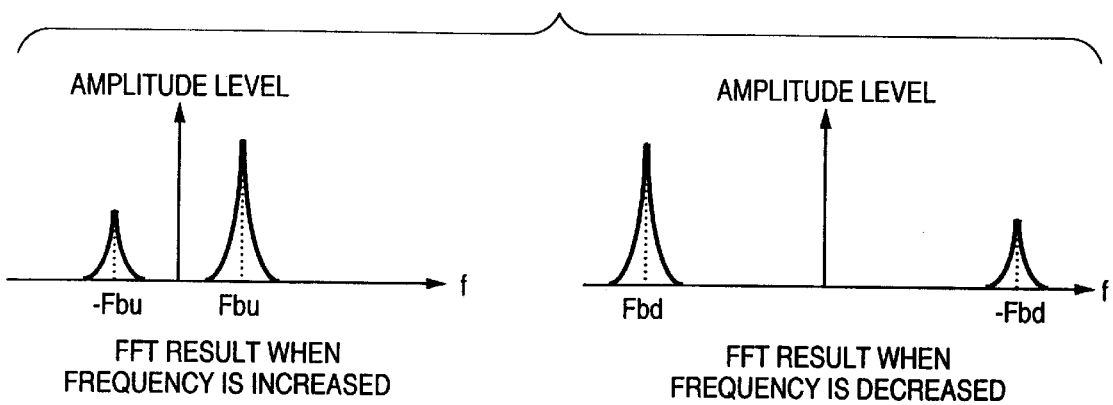
FIG. 7 is an explanatory diagram for explaining spectrums detected when an IQ balance is deteriorated.

Now, a description will be made of the embodiment 1. As previously explained, in the case that the IQ detecting mixer 8 is employed, when the unbalance phase difference and the unbalance amplitude of IQ are produced in the I-channel signal and the Q-channel signal, which are entered into the A/D converter 11, the false spectrums appear in the frequencies of the spectrums, the positive/negative symbols of which are inverted, as indicated in FIG. 7. In this case, the reception energy is subdivided into two spectrums (spectra), namely a true spectrum and a false spectrum. The level of the true spectrum is lowered. As a result, the detection performance of the radar apparatus is lowered, and also when the angle-measuring operation is carried out by using the reception strength, the error occurs in the measured-angle value. Therefore, the amplitude value of the true spectrum is corrected so as to perform the angle measuring operation.

Next, a correcting method will now be explained as a concrete example. As one correcting method, the following method may be conceived. While previously determining how an amplitude level is decreased by an amplitude error and a phase error by way of an experiment, these determined amplitude levels are stored in a memory so as to perform a level correcting operation.

Also, there is another method for correcting an amplitude level by way of a calculation. In this case, it is now assumed in acquired FFT results that one FFT result of one pair of spectrums whose positive/negative frequency symbols are inverted is given as:

$$Sb = Ab + jBb,$$

and the other FFT result is given as:

$$Ss = As + jBs,$$

an amplitude of a true spectrum in the case that a phase error and an amplitude error are not originally produced is expressed by:

$$M = \{(Ab+As)^2 + (Bb-Bs)^2\}^{1/2}.$$

For instance, it is now assumed that a 3 Hz-signal having an amplitude of 1 and a phase difference of 90 degrees as IQ signals is processed by the complex FFT of 64 points.

In the case that there are no phase error and no amplitude error, a complex FFT result is given as follows:
(18.5782193442855−61.2441814868614i) in the frequency of 3 Hz, and (0−0i) in the frequency of −3 Hz. This implies that this condition is an ideal IQ detection condition under which there is neither a phase error, nor an amplitude error, and there are no spectrums whose positive/negative frequency symbols are inverted. As a consequence, a reception strength "M" of a spectrum at a frequency of 3 Hz is given as follows:
$((18.5782193442855)^2 + (-61.2441814868614)^2)^{1/2} = 64$.

For instance, in such a case that the phase error is equal to 10 degrees (namely when Q-channel owns a phase of 90°−10°=80° with respect to I-channel), a complex FFT result is given as follows:
In the frequency of 3 Hz, the complex FFT result becomes:
(23.7545671497977−59.1659261542888i).
In the frequency of −3 Hz, the complex FFT result becomes:
(−5.17634780551222+2.07825533257265i).
This implies the IQ detection result when the phase error is produced, and such a fact that the spectrums whose positive/negative frequency symbols appear. As a consequence, the reception strength "M" of the spectrum in the frequency of 3 Hz is given as follows:
$((23.7545671497977)^2 + (-59.1659261542888)^2)^{1/2} = 63.75646$.

In this phase error case, there is an error in the amplitude level, as compared with the above-described ideal case, so that an error is produced in an angle measuring operation. To avoid this erroneous angle measuring operation, when the receptions strength is corrected by using data about a false spectrum of −3 Hz as $M = \{(Ab+As)^2 + (Bb-Bs)^2\}^{1/2}$, the corrected reception strength "M" is given as follows:
$M = ((23.7545671497977 - 5.17634780551222)^2 + (-59.1659261542888 - 2.07825533257265)^2)^{1/2} = ((18.5782193442855)^2 + (-61.2441814868614)^2)^{1/2} = 64$.
As a result, this corrected reception strength is equal to the reception strength "M" under the ideal IQ detection condition.

Also, for example, in the case that the phase error is 10 degrees (i.e., when Q-channel owns a phase of 90°−10°=80° with respect to I-channel) and the amplitude error is 6 dB (namely, amplitude of I-channel signal is 1 and amplitude of Q-channel signal is 2), complex FFT results are given as follows:
In the frequency of 3 Hz, the complex FFT result is given by:
(38.2200246274527−87.7097615651469i).
In the frequency of −3 Hz, the complex FFT result is given by:
(−19.6418052831673−26.4655800782854i).
This implies such an IQ detection result when there are a phase error and also an amplitude error, and therefore, implies such a fact that the spectrums whose positive/negative frequency symbols appear. As a consequence, the reception strength "M" of the spectrum in the frequency of 3 Hz is given as follows:
$(38.2200246274527)^2 + (-87.7097615651469)^2)^{1/2} = 95.67535$.

In this case, there is an error in the reception strength, as compared with the above-described ideal case, so that an error is produced in an angle measuring operation. To avoid this erroneous angle measuring operation, when the receptions strength is corrected by using data about a false spectrum of −3 Hz as $M = \{(Ab+As)^2 + (Bb-Bs)^2\}^{1/2}$, the corrected reception strength "M" is given as follows:
$M = ((38.2200246274527 - 19.6418052831673)^2 + (-87.7097615651469 + 26.4655800782854)^2)^{1/2} = ((18.5782193442855)^2 + (61.2441814868614)^2)^{1/2} = 64$. As a result, this corrected reception strength is equal to the reception strength "M" under the ideal IQ detection condition. As a consequence, since the reception strength is corrected based upon $M = \{(Ab+As)^2 + (Bb-Bs)^2\}^{1/2}$, such a reception strength "M" can be correctly acquired under the ideal IQ detection condition.

Figure 2:
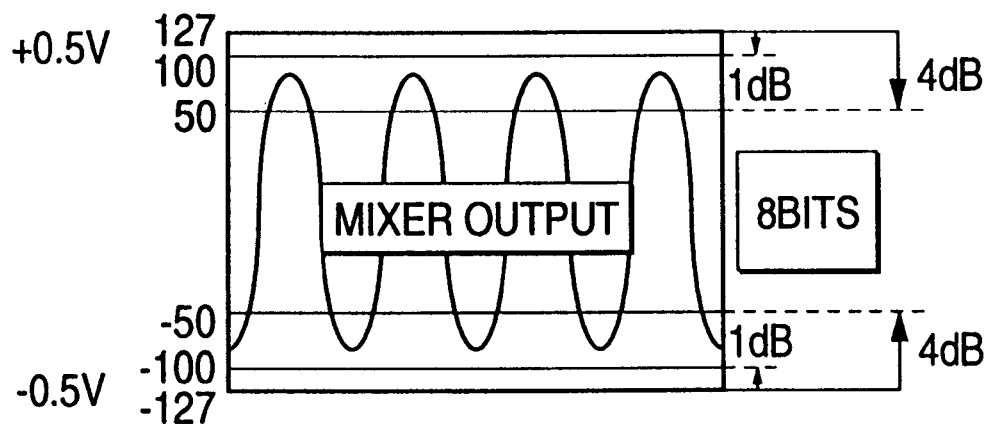
FIG. 2 is an explanatory diagram for explaining operation of AGC in the embodiment 1.
Figure 3:
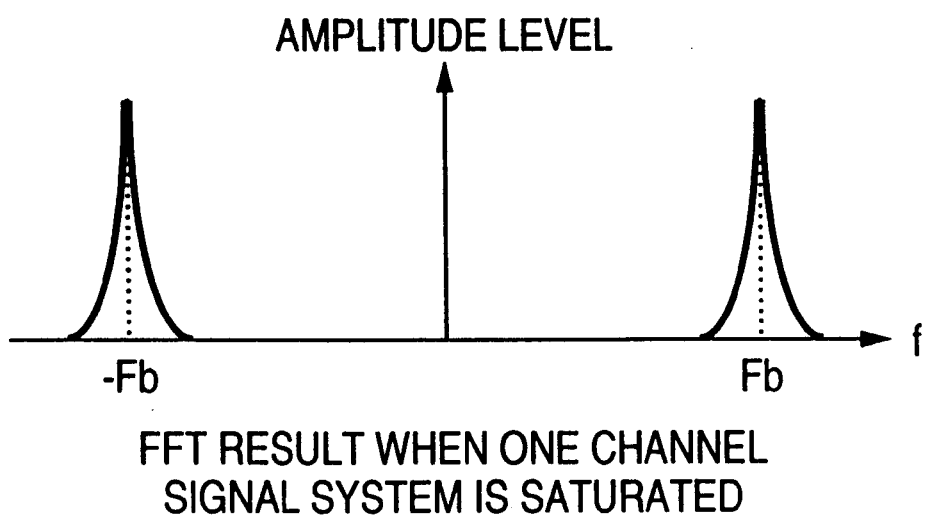
FIG. 3 is an explanatory diagram for explaining a true spectrum and a false spectrum when a signal reception system is saturated.

Referring now to a flow chart shown in FIG. 1, concrete operations of the radar apparatus will be explained. First, beat signals in two phases, namely while the frequency is increased and also is decreased, are acquired along three directions (steps S1, S2, S3, and S4). Although the beat signal acquisition direction is defined as the three directions in this embodiment, this beat signal acquisition direction may be defined as any directions. Now, a maximum value of each of the beat signals is acquired, and an AGC amount for the next time is determined to thereby set the AGC 10 (steps S5 to S8). In this case, such an image diagram is shown in FIG. 2, by which the gain amount (Gain) of this AGC 10 is feedback-controlled and is again set. In FIG. 2, there is shown such a sampling result that the signal amplified by the AGC 10 is sampled by the A/D converter 11 in a time sequential manner. The signal processing apparatus 12 sets the gain amount of the AGC 10 in such a manner that the maximum amplitude of the amplified signal may be always converged into a preselected range. As a typical example in this embodiment, assuming now that a maximum input value of the A/D converter 11 is selected to be 0.5 V, while a digital value is 127 and a minimum input value is −0.5 V at this time, a digital value is selected to be −127 at this time. Also, the above-described predetermined range is defined between a point (digital value of 50) located below the maximum input value by 4 dB and another point (digital value of 100) located below the maximum input value by 1 dB, while estimating a margin. The signal processing apparatus 12 performs the feedback control such that the maximum amplitude of the amplified signal may be continuously converged into this range.

Figure 6:
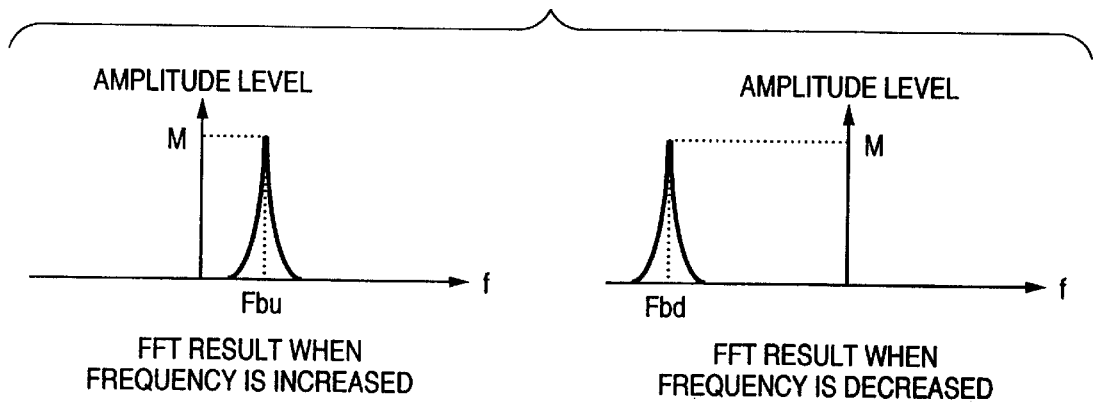
FIG. 6 is an explanatory diagram for explaining spectrums detected when a good IQ balance is achieved.

Next, the beat signals acquired along three directions in the six phases are processed by the complex FFT processing operation (step S9). It should be understood that the phase numbers are different from each other, depending upon the selected distance-measuring methods and the selected speed-measuring methods. Subsequently, in all of the phases where the complex FFT processing operations have been carried out, a threshold level is set which is equal to approximately 4 times higher than a noise floor (step S10). It should also be noted that the noise floor corresponds to an average value of an amplitude level in a noise portion, and an abscissa shown in FIG. 6 corresponds to the level of the noise floor. Also, the threshold levels are separately set to the respective phases. Alternatively, since the noise level is equal to each other even in any phases, an average value of these separately set noise levels is calculated. Then, the averaged noise level may be used as the noise floor. Furthermore, the threshold level is set to be approximately 4 times higher than the noise floor in this embodiment. Alternatively, this threshold level may be varied in correspondence with a radar specification. Alternatively, a threshold level may be determined by performing the CFAR (constant false alarm rate processing operation). Next, a noise component is removed by extracting both a frequency of a spectrum and a peak value of an amplitude level higher than the threshold level (step S11). Then, a pair of spectrums whose positive/negative frequency symbols are inverted are sought with respect to the extracted frequency and the extracted peak value (step S12). When a judgment is made as to whether or not a pair of spectrums own the inverted positive/negative frequency symbols, a judgment width containing a preselected margin may be set.

Next, as to the sought pair of spectrums at the previous steps S12, while using both an FFT value of a spectrum having a small peak value and another FFT value of another spectrum having a large peak value, an amplitude level of such a spectrum having the large peak value is corrected by the above-described method. Furthermore, the spectrum having the small peak value is erased, and the total number of spectrums extracted at the step S11 is reduced (step S13). Next, a distance, and a relative speed are calculated by way of the above-explained formulae (1) and (2) based upon the frequencies of the remaining spectrums at the previous step S13 (step S14). Next, as to the target objects having the same distances and the same relative speeds along the respective directions (namely, same target object), an angle-measuring operation is carried out based on the formulae (8) and (9) by employing the peak value M1 and M2 of the amplitude levels corrected at the step S13 (step S15). Thereafter, an end is judged (step S16). At the step S16, the process operation is accomplished, because the power supply is turned OFF, the distance-measuring stop instruction is issued, and a fail.

If the process operation is not accomplished, then the process operation is returned to the previous step S1.

In this case, when one channel signal is saturated among the I-channel signal and the Q-channel signal, similar to the 1-channel detection, spectrums having the same amplitude levels, the positive/negative frequency symbols of which are inverted, appear at the step S9. The reason why there is such a possibility that one channel signal is saturated although the AGC value is set is given as follows. That is to say, the data acquired in the present time causes the AGC value based upon the measurement result obtained during the previous time. In this case, since the amplitudes are identical to each other, it is practically difficult to judge which spectrum corresponds to the true spectrum at the step S13. As a consequence, a judgment is made as to which spectrum corresponds to the true spectrum by employing the past history. In other words, the judgment is made based on the previous selection result so as to select the true spectrum. That is to say, in the case that such a spectrum having a negative frequency symbol and a small peak value of an amplitude level is judged from the spectrums whose frequency symbols are inverted and then is deleted during the preceding process operation, if the spectrum has the same frequency during the present process operation, then the spectrum whose frequency symbol is negative is deleted. Alternatively, such a true spectrum may be selected from the spectrums whose frequency symbols are inverted based upon the past monitoring results acquired during several processing operations. In other words, in order to increase the confirmation characteristic, such a judgment is made as to whether or not any one of the positive and negative frequency symbols has been selected during the several past processing operation with a higher potential, and then such a spectrum having the selected frequency symbol may be selected.

It should also be noted that the peak value of the amplitude level may be corrected based upon the above-described method.

In the above-described embodiment 1, a pair of spectrums whose positive/negative frequency symbols are inverted are sought, and then it is judged that such a spectrum having a smaller amplitude level is not equal to a true spectrum. Since there is a certain possibility that the frequency is shifted by approximated 1 bin due to the linearity and temperature variation in the oscillator 1 and the complex FFT calculation, when a pair of spectrums while positive/negative frequency symbols are inverted are sought, it is desirable to set such a judgment range having margin defined by +1 bin and −1 bin.

It should be understood that a term "bin" implies a minimum frequency slice which is determined by a total point number of FFT and also measuring time.

Also, in the embodiment 1, after the threshold level is set, a pair of spectrums are extracted. Alternatively, a peak is acquired from a complex FFT result in order to judge whether or not a frequency symbol of a spectrum is positive. Then, a large amplitude level of a spectrum having a large level is corrected, and data about a spectrum having a small level is deleted. Thereafter, a threshold level set, and such a spectrum having a level higher than, or equal to this set threshold level may be extracted. In this alternative case, as to such a spectrum which cannot be detected because the level of this spectrum is substantially identical to the threshold level, after the amplitude level thereof is corrected to be an original amplitude level thereof, this spectrum is detected by the threshold level. As a consequence, it is possible to avoid such a deterioration in the detection performance which is caused by the IQ balance.

In accordance with the above-described embodiment 1, even when the phase error is produced between the I-channel signal and the Q-channel signal derived from the IQ detecting mixer 8 and also the unbalance amplitude values are produced between these I/Q-channel signals, since the peak value "M" of the amplitude level can be correctly measured, there is no possibility that the detection performance is not deteriorated due to deterioration in the IQ balance. Also, since the peak value "M" of the amplitude level can be correctly measured, the angle-measuring error can be suppressed.

In the above-described embodiment 1, the beat signals of the two phases are processed by the complex FFT process operation when the frequency is increased and further is decreased at the step S1. This complex FFT process operation is different, depending upon the distance-measuring method and speed-measuring method. For instance, when the frequency is increased, there is no frequency change (non-modulation). When the frequency is decreased, the beat signals of the 3 phases are processed by the complex FFT process operation. Alternatively, the complex FFT processing operations are carried out in combination with the process operation when the frequency is increased, and the process operation when the frequency is constant. At this step, the phases required for calculating the distance and the speed are FFT-processed, which is however the same as such a technical point that while a pair of spectrums whose positive/negative frequency symbols are inverted are found out from the FFT process result, the amplitude level is corrected based on the paired spectrums so as to acquire a peak value "M" of a true amplitude level.

As previously described, the radar apparatus of the present invention is featured by comprising: transmitting means for outputting a transmission electromagnetic wave; receiving means for IQ-phase-detecting a reception electromagnetic wave received when the transmission electromagnetic wave is reflected from a target object and returned from the target object; signal converting means for converting an output signal of the receiving means into data indicated by a relationship between a frequency and an amplitude level of the output signal, from which a frequency spectrum is revealed; and amplitude level correcting means in which if there are one pair of spectrums having positive and negative peak values of amplitude levels, while absolute values of frequencies thereof are identical to each other, among the data converted by this signal converting means, then the amplitude level having the larger peak value is corrected so as to acquire a peak value of a true amplitude level. As a consequence, lowering of the peak value of the amplitude level contained in the true spectrum, which is caused by the deterioration in the IQ balance, can be corrected as a true value corresponding to the originally correct value. Therefore, the detection performance of the target object in the radar apparatus can be improved without additionally employing a specific apparatus.

Also, the radar apparatus of the present invention is featured by further comprising: beam scanning means for changing a beam direction of a transmission electromagnetic wave outputted from the transmitting means and also a beam direction of a reception electromagnetic wave returned from the target object; and measured-angle processing means for calculating a direction of the target object based upon reception signals produced along a plurality of beam direction changed by the beam scanning means as to the same target object by using the peak value of the true amplitude level along each of the directions, acquired by the amplitude level correcting means. As a consequence, lowering of the peak value of the amplitude level contained in the true spectrum, which is caused by the deterioration in the IQ balance, can be corrected as a true value corresponding to the originally correct value. Therefore, the angle-measuring operation of the target object in the radar apparatus can be correctly carried out without additionally employing a specific apparatus.

Furthermore, the judgment width containing preselected margin is set in order to judge as to whether or not the absolute values of the frequencies are identical to each other. As a result, even when the various errors are produced due to the linearity and temperature changes in the oscillator and also the FFT calculation, it is possible to correctly seek a pair of spectrums whose positive/negative frequency symbols are inverted.

What is claimed is:

1. A radar apparatus comprising:

transmitting means for outputting a transmission electromagnetic wave;

receiving means for IQ-phase-detecting a reception electromagnetic wave received when the transmission electromagnetic wave is reflected from a target object and returned from the target object;

signal converting means for converting an output signal of said receiving means into data indicated by a relationship between a frequency and an amplitude level of the output signal, from which a frequency spectrum is revealed; and amplitude level correcting means in which if there are one pair of spectrums having positive and negative peak values of amplitude levels, while absolute values of frequencies thereof are identical to each other, among the data converted by said signal converting means, then the amplitude level having the larger peak value is corrected so as to acquire a peak value of a true amplitude level.

2. The radar apparatus according to claim 1, further comprising:

beam scanning means for changing a beam direction of a transmission electromagnetic wave outputted from said transmitting means and a beam direction of a reception electromagnetic wave returned from the target object; and measured-angle processing means for calculating a direction of the target object based upon reception signals produced along a plurality of beam direction changed by said beam scanning means as to the same target object by using the peak value of the true amplitude level along each of the directions, acquired by said amplitude level correcting means.

3. The radar apparatus according to claim 1, wherein
   in a case that spectrums having both the positive and negative peak values and the frequencies whose absolute values are identical to each other are acquired as (Ab+jBb) and (As+jBs), said amplitude level correcting means calculates the peak value of the true amplitude level as $\{(Ab+As)^2+(Bb-Bs)^2\}^{1/2}$.

4. The radar apparatus according to claim 1, wherein
   said amplitude level correcting means corrects the peak value of the amplitude level based upon data which is previously acquired by way of an experiment to be stored.

5. The radar apparatus according to claim 1, wherein
   said signal converting means FFT (fast Fourier transform)-transforms an I-channel signal and a Q-channel signal, which are IQ-phase-detected, as a real number part and an imaginary number part, respectively.

6. The radar apparatus according to claim 1, wherein in order to judge that the absolute values of the frequencies are identical to each other, a judgement width containing a predetermined margin is set.

7. The radar apparatus according to claim 6, wherein said judgement width containing the predetermined margin is selected to be on the order of +1 bin and −1 bin.

* * * * *